United States Patent
Bentfors

[15] 3,650,871
[45] Mar. 21, 1972

[54] METHOD OF PRODUCING INSULATING PANELS

[72] Inventor: Karl Waldemar Bentfors, Utsiktsvagen 14, Motala, Sweden

[22] Filed: June 9, 1969

[21] Appl. No.: 831,508

[52] U.S. Cl. .............................. 156/269, 156/79, 156/197, 156/276, 156/304
[51] Int. Cl. ..................................... B32b 31/00, B32b 5/20
[58] Field of Search.................... 156/197, 42, 304, 269, 276, 156/79; 161/160, 168

[56] References Cited

UNITED STATES PATENTS

| | | | |
|---|---|---|---|
| 2,292,024 | 8/1942 | Dreher | 161/160 |
| 3,095,943 | 7/1963 | Kemp | 161/168 X |
| 3,170,827 | 2/1965 | Voelker | 161/168 X |
| 3,099,518 | 7/1963 | Wetzler | 156/79 X |
| 3,249,659 | 5/1966 | Voelker | 156/79 X |

Primary Examiner—Benjamin A. Borchelt
Assistant Examiner—G. E. Montone
Attorney—Young & Thompson

[57] ABSTRACT

A method for producing insulated panels of a honeycomb structure surrounded by a frame, in which the panels are continuously fed below a discharging device which fills the honeycomb with polystyrene, granular or ground waste material having insulating properties. Before or after filling, the honeycomb structure may be closed by a subjacent cover board or sheet, and an upper cover board or sheet is applied after filling, the upper and lower cover boards or sheets being adhesively bonded to the honeycomb.

1 Claims, 1 Drawing Figure

PATENTED MAR 21 1972
3,650,871
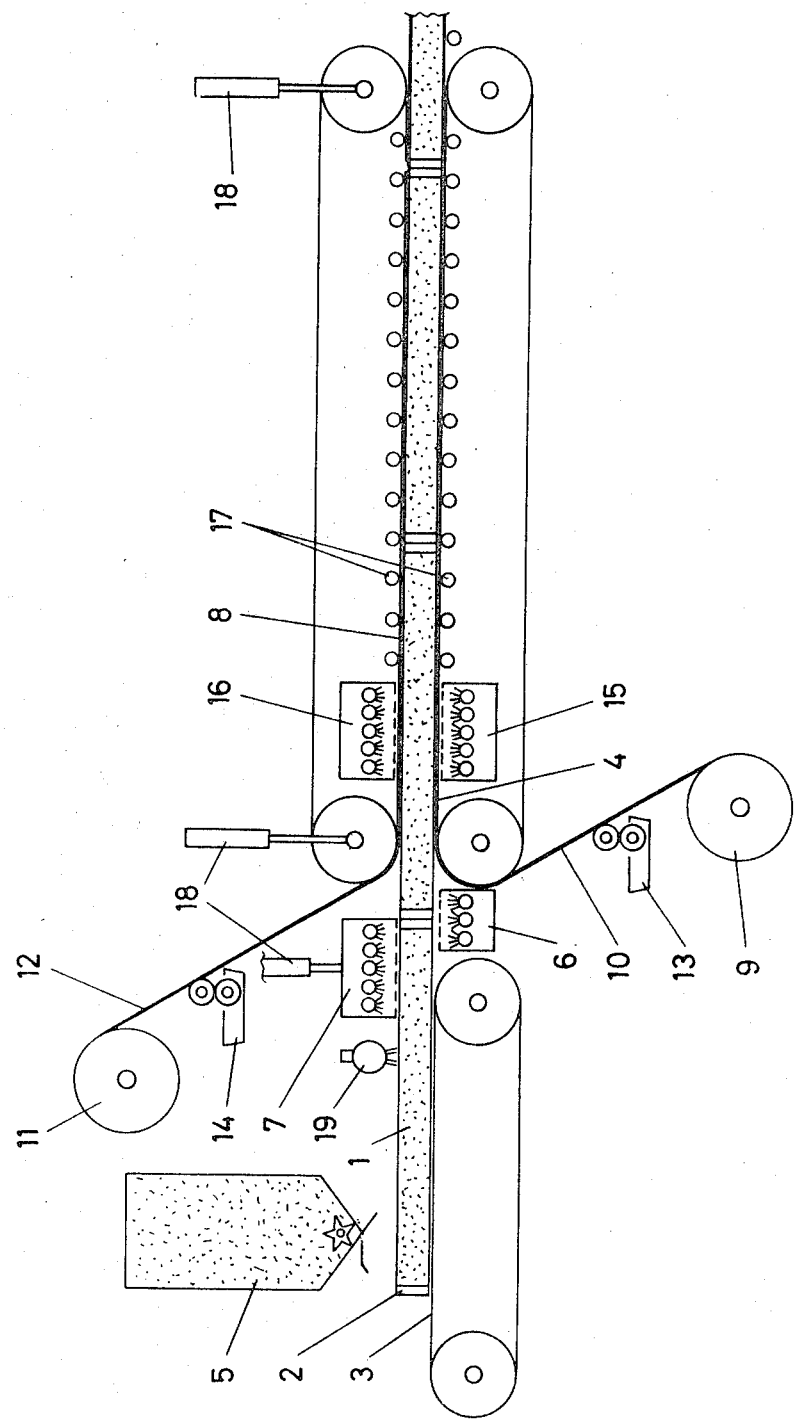
INVENTOR
KARL WALDEMAR BENTFORS
BY Young & Thompson
ATTYS.

METHOD OF PRODUCING INSULATING PANELS

This invention relates to methods of producing insulating panels, especially suitable for building purposes.

Insulating boards made of polystyrene cellular plastic are very brittle and easy to break. It is therefore necessary to reinforce them by using relatively thick cover boards on each side of the insulating boards, so that they can be used for instance as wall panels.

The principal object of the invention is to improve the strength of such insulating boards, so that thinner materials can be used as skin, for instance thin metal plates, paper, plastic-coated fabrics, glass fiber materials etc.

It is another object of the invention to use a honeycomb structure as reinforcement for the insulating board and to have the cells of the honeycomb filled up with cellular plastic.

Still another object of the invention is to use as filler in the cells ground waste material having insulating properties, e.g., wood, bark, paper and cardboard.

Other objects and advantages of the present invention will become apparent upon reading the following specification and referring to the accompanying drawing in which apparatus for practicing the invention is diagrammatically shown in elevation.

In the drawing 1 is a cell structure built up of edgewise disposed strips connected to each other at points along their length and comprising a number of cell openings. This structure, a so called honeycomb structure, is placed within a surrounding frame 2, the cell openings of the structure according to the invention being filled up with an insulating material.

According to the method shown in the drawing the filling takes place during the continuous feed of the board 1,2. For this purpose a first conveyor 3 and a second conveyor 4 are used, these conveyors for instance being of the perforated steel band type. The boards are fed one after the other from the left to the right in the drawing, in which three such boards and part of the fourth are shown. Above the conveyor 3 there is a hopper 5 for preexpanded polystyrene granulate which flows like a falling curtain by gravity into the cell openings of the honeycomb structure 1, when this is continuously fed by the conveyor 3.

The filled board is further fed between two steam supplying means, a lower one 6 and an upper one 7, in order to heat the granulate. From the conveyor 3 the board 1,2 is transferred to the conveyor 4. Above this is a further conveyor 8.

From a lower supply roll 9 a sheet 10 of paper, plastic-coated fabric, glass fiber material, thin metal plate or material like that is withdrawn and passes over the upper side of the conveyor 4. From an upper supply roll 11 a sheet 12 of the same or other kind of material than the sheet 10 is withdrawn and passes beneath the underside of the conveyor 8. Immediately after the supply rolls 9 and 11 the sheets 10 and 12 pass adhesive applying means 13 and 14. The adhesive is applied to the sides of the sheets 10 and 12 which face the boards 1,2. This means that the boards during their continuous feed will be provided with a skin on each side and this skin is thereafter by means of a cutting device cut off between each board.

The sheets 10 and 12 may have such properties in practical and decorative respect that the board will be directly usable as a wall panel without any following treatment, such as web coating, wall-papering or something similar. The boards can also be used as facing panels, in such cases preferably being metal or plastic coated on the intended outside, the coating being carried out in the way described above.

Two further steam supplying means, a lower one 15 and an upper one 16 are placed in the vicinity of the conveyors 4 and 8 respectively in order to bring about the final blowing and expanding of the polystyrene granulate. Preferably the boards are thereafter transported past a cooling device, not shown.

In order to have the sheets supplied evenly to the boards and keep the boards flat there is arranged below the conveyor 4 and above the conveyor 8 adjacent the feed path of the boards two series of support rollers 17.

By means of hydraulic lift devices 18 the upper conveyor 8 and the steam supplying means 7 and 16 can be adjusted to the proper level with respect to the thickness of the board.

If plastic foam is used in the cells of the honeycomb structure the injection can be done by means of a nozzle 19. This nozzle eliminates the hopper 5 and also the steam supplying means 6,7,15 and 16 are replaced by coolers.

If it is desired to have on both sides of the honeycomb structure a thicker, non-rollable board, such as a plaster wall board, a fiber board or the like the sheets 10 and 11 are not used, if another finishing is intended. In this case the structure 1 and the frame 2 from the beginning is provided with a lower such cover board. After the structure has been filled with the insulating material the upper cover board is applied.

Except cellular plastic can as filler in the honeycomb structure also other insulating materials can also be used as fillers in the honeycomb structure. It is also possible to use waste material having insulating properties, such as wood, bark, paper and cardboard, the paper and cardboard waste material otherwise often being transported to a garbage disposal plant to be incinerated. This waste material is ground to a proper particle size and is filled into the cell openings of the structure. In order to have this material resist the ravages of time it may be preferred to mix into the material some sort of a preservative, for instance resin. A pressing procedure may be used to have the insulated material better packed in the cell openings.

I claim:

1. A method for producing insulating panels comprising a honeycomb structure surrounded by a frame, comprising feeding a plurality of said panels one behind the other with their frames in abutting relationship thereby to provide a continuous panel expanse in the feed direction of the panels, continuously discharging insulating material into said continuous panel expanse in the form of a continuously falling curtain of insulating material of a width equal to the width of the honeycomb structure thereby continuously filling said material into the cell openings of said honeycomb structure, applying to said plurality of panels with their frames in abutting relationship subjacent and superposed covers of continuous flexible material that bridge over the joints between the abutting frames, and severing said flexible material between said frames.

* * * * *